(No Model.)
G. W. VONADA, Dec'd.
E. Vonada, Administratrix.
SPARK ARRESTER.
No. 581,566. Patented Apr. 27, 1897.
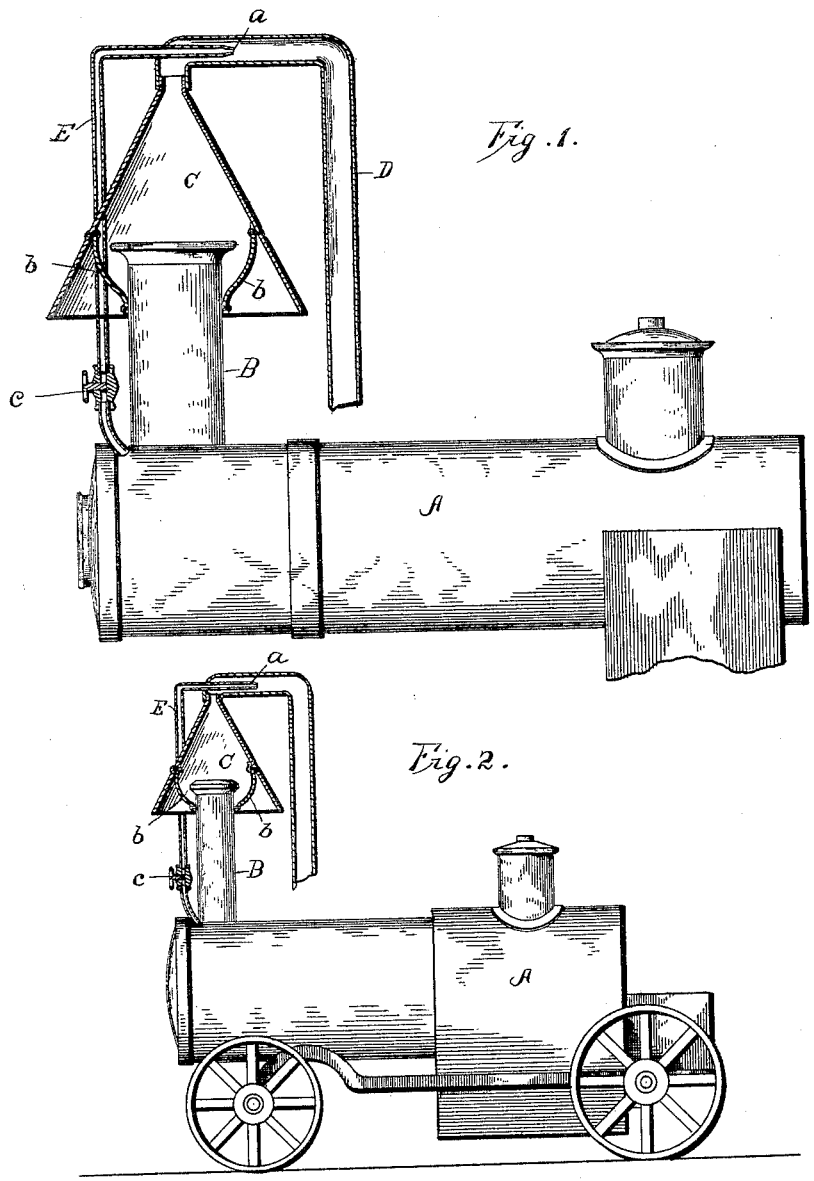

UNITED STATES PATENT OFFICE.

EDITH VONADA, OF FARMERS MILLS, PENNSYLVANIA, ADMINISTRATRIX OF GEORGE W. VONADA, DECEASED.

SPARK-ARRESTER.

SPECIFICATION forming part of Letters Patent No. 581,566, dated April 27, 1897.

Application filed December 12, 1896. Serial No. 615,523. (No model.)

*To all whom it may concern:*

Be it known that I, EDITH VONADA, of Farmers Mills, in the county of Centre and State of Pennsylvania, (administratrix of the estate of GEORGE W. VONADA, deceased,) declare that the said GEORGE W. VONADA did invent certain new and useful Improvements in Spark-Arresters; and I do hereby declare that the following is a full, clear, and exact description of the invention, which will enable others skilled in the art to which it appertains to make and use the same, reference being had to the accompanying drawings, and to the letters thereon, which form a part of this specification.

This invention has relation to spark-arresters for locomotives, portable and other engines, and has for its object to arrest the sparks and other heavy products of combustion which issue out of the smoke-stack unconsumed, but in an ignited condition.

A further object of the invention is to extinguish sparks rising from a smoke-stack or chimney during their passage by a jet of saturated steam or conveying them to a vessel holding water, the vessel being conveniently located near or on the boiler.

A further object of the invention is to force the sparks after leaving the smoke-stack into a conveyer pipe or conduit by means of a steam-jet, by which the heavier waste products of combustion are separated from the smoke, and thus not only avoiding the danger of setting on fire adjoining property, but saving said heavy products for future consumption.

Heretofore many attempts have been made to accomplish the before-mentioned objects which have been more or less successful, and therefore no claim is made to such devices.

It is well known that great danger exists from fire caused by sparks and unconsumed products of combustion, &c., escaping from the smoke-stacks of locomotives while passing through the country, and that large conflagrations have taken place from live coals and sparks thrown from the smoke-stacks, causing great loss and damage, as well as endangering life. It is also well known that danger exists from agricultural engines and boilers used on farms, such as for threshing grain, grinding, and other uses. To prevent and overcome this danger and loss of property are other objects had in view; and to this end the invention consists in arresting the sparks, live coals, and the like after they leave the smoke-stack by placing a bonnet immediately over the smoke-stack, and secured thereto to the top or apex of the bonnet a conveyer or conduit is attached, and into said conveyer a steam-jet pipe or nozzle is inserted, connecting with the steam-space of the boiler, preferably near the water-line, so that saturated steam may be used in the extinguishment of sparks, &c., and at the same time draw the sparks from the smoke-stack to the bonnet and conveyer by suction or partial vacuum, and in other details of construction, as will be hereinafter described, and pointed out in the claims.

Figure 1 in the drawings shows a locomotive-boiler, illustrating the bonnet in vertical cross-section securely fixed to the smoke-stack; Fig. 2, a portable land-boiler for agricultural purposes, mills, or the like.

The same letters will indicate like parts in both the figures, in which—

A is the boiler, B the smoke-stack, and C the bonnet or hood; D, the smoke-conveyer, and E the steam-jet pipe.

*a* is the steam-nozzle, and *b b* the supporting-brackets. There may be as many of these brackets as may be necessary to support the bonnet or hood.

In Fig. 1 the steam-jet pipe is shown as running through the bonnet, which will in a manner serve to keep it in place.

In Fig. 2 the steam-pipe extends outside of the hood or bonnet. It is obvious that the hood and steam-pipe may be secured together in any approved manner.

While it is preferred to connect the steam-jet pipe to the portion of the boiler having saturated steam, it may be connected to the steam-dome or the water portion of the boiler, the main object being to draw the live sparks and coals to the conveyer and extinguish them, and the object of the hood or bonnet is to arrest the live sparks and coals and by its conical shape direct them to the conveyer, the mouth of which is immediately over the small portion of the hood or bonnet.

The operation of the device is as follows: Fire being started in the furnace, the smoke of course passes out the top of the smoke-stack. When the fire is well under way and in full blast, live sparks and coals are carried out with the smoke with considerable force, steam is let onto the jet-pipe, which forms a suction in the conveyer, and then the coals and sparks passing from the stack are drawn into it and forced from it, the jet in the first instance drawing and secondly forcing them from and through the conveyer to a receptacal arranged for the purpose. The steam-jet pipe may be provided with a valve c or other means for letting on steam. While the live sparks and coals are drawn to the conveyer, the light smoke passes down and out between the smoke-stack and hood. The hood is purposely extended down below the top of the smoke-stack, so that the sparks are thrown well up into the hood that they may be more readily taken up by the suction of the jet to the mouth of the conveyer.

It is evident that modifications may be made in the forms, construction, and arrangements of parts without departing from the spirit and scope of the invention. I do not, therefore, wish to be confined to the exact arrangement shown, but consider myself entitled to all such changes.

Having thus described the invention and the best means known at present for carrying the same into effect, what is claimed, and desired to be secured by Letters Patent, is—

1. The combination in a spark-arrester of the smoke-stack, the conical hood arranged over the smoke-stack having its lower portion extending below the top of said stack, and open to the atmosphere, the conveyer-pipe and the steam-jet pipe as set forth.

2. The combination in a spark-arrester of the smoke-stack, the conical hood arranged over and encircling the upper portion of said stack, the conveyer-pipe attached to the upper small portion of the hood, the jet-pipe arranged within the conveyer-pipe near its mouth, the said hood being supported and carried by the stack and arranged to leave a space open to the atmosphere between the stack and the hood for the escape of smoke substantially as described.

In testimony that I claim the foregoing as the invention of GEORGE W. VONADA, deceased, I affix my signature as administratrix of his estate in the presence of two witnesses.

EDITH VONADA.

Witnesses:
AUSTIN O. FURST,
CHAS. P. HEWES.